(12) United States Patent
Shen-Orr et al.

(10) Patent No.: US 7,940,930 B2
(45) Date of Patent: May 10, 2011

(54) NATIVE SCRAMBLING SYSTEM

(75) Inventors: Chaim Shen-Orr, Haifa (IL); Eliphaz Hibshoosh, Tel Aviv (IL); Yaacov Belenky, Maaleh Adumim (IL); Yaakov (Jordan) Levy, Maaleh Adumim (IL)

(73) Assignee: NDS Limited, Staines, Middlesex (GB)

( * ) Notice: Subject to any disclaimer, the term of this patent is extended or adjusted under 35 U.S.C. 154(b) by 841 days.

(21) Appl. No.: 11/918,110

(22) PCT Filed: Mar. 22, 2006

(86) PCT No.: PCT/IL2006/000367
§ 371 (c)(1),
(2), (4) Date: Nov. 19, 2007

(87) PCT Pub. No.: WO2006/117775
PCT Pub. Date: Nov. 9, 2006

(65) Prior Publication Data
US 2008/0137851 A1      Jun. 12, 2008

(30) Foreign Application Priority Data

May 2, 2005    (IL) .......................................... 168337
May 9, 2005    (IL) .......................................... 168496
Sep. 20, 2005  (IL) .......................................... 170987

(51) Int. Cl.
*H04N 7/167*  (2006.01)
*H04L 29/06*  (2006.01)

(52) U.S. Cl. ........ 380/210; 380/200; 380/201; 380/202; 380/205; 380/207; 380/209; 380/277; 380/278; 380/280; 380/44; 713/151; 713/152; 713/153; 713/154; 713/160; 713/162; 726/3; 726/13; 726/26; 726/30; 370/470; 370/471; 370/472; 370/476

(58) Field of Classification Search .................. 713/160, 713/154; 380/210, 200, 205; 726/26
See application file for complete search history.

(56) References Cited

U.S. PATENT DOCUMENTS 4,229,818 A    10/1980    Matyas et al.
(Continued)

FOREIGN PATENT DOCUMENTS
DE        199 06 450 C1    8/2000
(Continued)

OTHER PUBLICATIONS

May 6, 2010 Office Communication in connection with prosecution of AU 2006 242833 (2 pages).
(Continued)

*Primary Examiner* — Edan Orgad
*Assistant Examiner* — Jenise E Jackson
(74) *Attorney, Agent, or Firm* — Husch Blackwell LLP

(57) ABSTRACT

A system for scrambling/descrambling packets of a stream of content, each packet having a must stay clear (MSC) section, the system including an input handler including a receiving module to receive the stream, a characteristic analyzer to analyze the stream in order to determine a data independent characteristic of each packet, and a scrambling/descrambling device operationally associated with the input handler, the scrambling/descrambling device including a receiving module to receive the data independent characteristic for each packet from the input handler, and an Initial Value module to determine an Initial Value for each packet as a function of the data independent characteristic of one of the packets being processed, wherein the scrambling/descrambling device is adapted to scramble and/or descramble the packets based on the Initial Value and a Control Word. Related apparatus and methods are included.

13 Claims, 9 Drawing Sheets

U.S. PATENT DOCUMENTS

| | | | |
|---|---|---|---|
| 4,731,843 A | 3/1988 | Holmquist | |
| 5,623,549 A * | 4/1997 | Ritter | 380/37 |
| 6,026,164 A | 2/2000 | Sakamoto et al. | |
| 6,249,582 B1 | 6/2001 | Gilley | |
| 6,460,137 B1 * | 10/2002 | Akiyama et al. | 713/160 |
| 6,578,150 B2 | 6/2003 | Luyster | |
| 6,879,689 B2 | 4/2005 | Carroll et al. | |
| 7,043,022 B1 * | 5/2006 | Blanchard et al. | 380/252 |
| 7,124,303 B2 | 10/2006 | Candelore et al. | |
| 7,218,738 B2 | 5/2007 | Pedlow et al. | |
| 7,224,798 B2 | 5/2007 | Pinder et al. | |
| 7,286,667 B1 | 10/2007 | Ryal | |
| 7,334,132 B1 * | 2/2008 | Kumar et al. | 713/189 |
| 7,336,787 B2 | 2/2008 | Unger et al. | |
| 7,376,233 B2 | 5/2008 | Candelore et al. | |
| 7,409,702 B2 | 8/2008 | Cao | |
| 7,490,236 B2 | 2/2009 | Wasilewski | |
| 7,508,942 B2 | 3/2009 | Candelore | |
| 2001/0043621 A1 * | 11/2001 | Anderson et al. | 370/516 |
| 2002/0015400 A1 * | 2/2002 | Morinaga et al. | 370/345 |
| 2002/0018565 A1 | 2/2002 | Luttrell et al. | |
| 2002/0059063 A1 * | 5/2002 | Tsutsui et al. | 704/210 |
| 2002/0138850 A1 * | 9/2002 | Basil et al. | 725/117 |
| 2003/0012372 A1 | 1/2003 | Cheng | |
| 2003/0021412 A1 * | 1/2003 | Candelore et al. | 380/217 |
| 2003/0147422 A1 * | 8/2003 | You et al. | 370/468 |
| 2004/0028231 A1 * | 2/2004 | Sako | 380/239 |
| 2004/0158703 A1 | 8/2004 | Lund | |
| 2004/0223611 A1 | 11/2004 | Yan et al. | |
| 2005/0152548 A1 * | 7/2005 | Wasilewski | 380/216 |
| 2007/0124252 A1 * | 5/2007 | Higashi et al. | 705/59 |
| 2007/0143784 A1 * | 6/2007 | Kubota et al. | 725/31 |
| 2007/0255947 A1 * | 11/2007 | Choudhury et al. | 713/161 |

FOREIGN PATENT DOCUMENTS

| | | |
|---|---|---|
| EP | 0 652 661 A2 | 5/1995 |
| EP | 0 778 706 A2 | 6/1997 |
| EP | 0 996 250 A2 | 4/2000 |
| EP | 1 237 320 A1 | 9/2002 |
| WO | WO 92/05647 | 4/1992 |
| WO | WO 99/66669 | 12/1999 |
| WO | WO 2004/086664 A2 | 10/2004 |

OTHER PUBLICATIONS

Jun. 11, 2008 Office Communication in connection with prosecution of Indian patent application 1116/MUMNP/2006.

Sep. 5, 2008 Office Communication in connection with prosecution of Chinese patent application 2004 800055831.

Feb. 12, 2009 Office Communication in connection with prosecution of European patent application. EP 04 711 432.7.

Apr. 9, 2009 Office Communication in connection with prosecution of Indian patent application No. 1116/MUMNP/2005.

Jun. 24, 2009 Office Communication in connection with prosecution of U.S. Appl. No. 10/541,002.

Jun. 16, 2010 Office Communication in connection with prosecution of European patent application EP 06 728 176.6.

D. Eastlake, et al., "US Secure Hash Algorithm 1 (SHA1)" (Network Working Group, Request for Comments, 3174, Sep. 2001) (available on World Wide Web at http://www.ietf.orp/rfc/rfc3174.txt?number=3174).

S.S. Maniccam et al., "Image and video encryption using SCAN patterns" Pattern Recognition, vol. 37 pp. 725-737 (Elsevier Ltd. 2004).

"DES Modes of Operation" (Federal Information Processing Standards Publication 81, Dec. 2, 1980) (available on World Wide Web at http://csrc.nist.gov/publications/fips/fips81/fips81.htm).

"Secure Hash Standard" (Federal Information Processing Standards Publication 180-1, Apr. 17, 1995) (available on World Wide Web at http://www.itl.nist.pov/fipspubs/fip180-1.htm).

"What is Cipher Feedback Mode?" (RSA Security, Inc. 2003) (available on World Wide Web at http://www.rsasecurity.com/rsalabs/faq/2-1-4-4.html).

Sep. 26, 2006 Office Communication in connection with prosecution of EP 0471 1432.7 (4 pages).

Jan. 30, 2007 Office Communication in connection with prosecution of EP 0471 1432.7 (6 pages).

Jul. 20, 2010 Office Communication in connection with prosecution of U.S. Appl. No. 10/541,002 (9 pages).

Aug. 24, 2010 Office Communication in connection with AU 2006 242833.

Benoit M. Macq, et al., "Cryptology for Digital TV Broadcasting," Proceedings of the IEEE (vol. 83., No. 6, Jun. 1995, pp. 944-957).

"Announcing the Advanced Encryption Standard (AES)", Federal Information Processing Standards Publication 197 (Nov. 26, 2001).

"Information Technology—Generic Coding of Moving Pictures and Associated Audio Information: Systems," International Standard ISO/IEC 13818-1 (2nd ed., Dec. 1, 2000).

* cited by examiner

NATIVE SCRAMBLING SYSTEM

The present application is a 35 USC §371 application of PCT/IL2006/000367, filed on 22 Mar. 2006 and entitled "Native Scrambling System", which was published on 9 Nov. 2006 in the English language with International Publication Number WO 2006/117775, and which relies for priority on Israel Patent Application No. 168337, filed on 2 May 2005, Israel Patent Application No. 168496, filed 9 May 2005, and Israel Patent Application No. 170987, filed 20 Sep. 2005.

FIELD OF THE INVENTION

The present invention relates to a scrambling/descrambling system and in particular, but not exclusively, relates to a scrambling/descrambling system for secure distribution and storage of digital content and data.

BACKGROUND OF THE INVENTION

By the way of introduction, a secure video processor (SVP) system is a content and data protection system for digital content distribution. The system's enforcement element is typically a standardized single-chip silicon hardware device named the secure video processor (SVP). The SVP generally employs a scrambling process for local protection of content.

The following references are also believed to represent the state of the art:

FIPS pub. 197 "Announcing the Advanced Scrambling Standard";

ISO/IBC 13818-1 "Information Technology—Generic Coding of Moving Pictures and Associated Audio Information Systems"; and PCT-publication WO 2004/086664 of NDS Ltd.

The disclosures of all references mentioned above and throughout the present specification, as well as the disclosures of all references mentioned in those references, are hereby incorporated herein by reference.

SUMMARY OF THE INVENTION

The present invention, in preferred embodiments thereof, seeks to provide an improved scrambling/descrambling system for digital content, typically applicable for both streaming and non-streaming audio-visual (A/V) content as well as data.

In general, devices which scramble and descramble digital content must perform both scrambling and descrambling of data. Preferably, in order to simplify hardware design and minimize hardware gate count, among other considerations, the inventors of the present invention believe that the following requirements should preferably be met in the system of the present invention:

(a) Although a large number of packets share the same Control Word (CW); and the packets cannot be "chained" due to a "zapping" requirement (in other words, to be able to begin descrambling at a random packet), an attacker needs to be prevented from detecting that an area of two different packets contains the same information, as data packets may carry sensitive information in patterned locations within the packet. Although the goal of the above point could be achieved by moving sensitive data to different locations in different packets, it is preferable to find a solution the above problem without having to create new signaling mechanisms for signaling the location of the sensitive data within each packet for the application using the data. The above point is typically more important for data security and less important for A/V security.

(b) The scrambling/descrambling Key is changed much less often than packets arrive; therefore, many packets are scrambled with the same Key.

(c) Packet scrambling and descrambling should both be performed in one pass.

(d) Certain bits of the packet must not be affected by scrambling and descrambling. That is, certain bits must stay "in the clear"; bits, bytes, or data that must stay in the clear are also termed herein "Must Stay Clear" or "MSC" bits, bytes or data. The reason for the requirement of certain bits being unaffected by scrambling and descrambling is in order to have some information about the stream available in the clear even before descrambling. For example, and without limiting the generality of the foregoing, in an MPEG-2 transport stream the first four bytes of each packet stay in the clear. The four first bytes provide information needed for demultiplexing, information as to whether the packet is scrambled, information as to whether the packet is scrambled with an even or odd Key (if the packet is scrambled) and other information as is well known in the art. In some packets, the header indicates that an initial part of the packet is an "adaptation field" which provides some other information necessary for the receiver; such information must stay in the clear as well. Optionally a sender may choose to send even part of video information in the clear, for example to make search easier in personal video recorder (PVR) systems.

(e) 128-bit AES should be used as the basic building block. However, it will be appreciated by those ordinarily skilled in the art that any other suitable scrambling standard may be used as the basic building block.

(f) Different types of transport streams, each defined by a "scheme" should be handled. The term "scheme" as used in the specification and claims is defined as a set of parameters (for example, but not limited to, packet length and the way of calculating the MSC part of each packet to be left unscrambled) for the content being transported. MPEG-2 is an example of a scheme which defines the parameters of the-transport stream.

(g) The scrambling/descrambling method should be as close as possible to a well-reviewed accepted method that has withstood the test of time.

(h) An attacker should not be able to change a single bit of the plaintext by changing a single bit of the ciphertext, except for singular cases such as short solitary blocks. The above point is typically more important for data security and less important for A/V security.

(i) The scrambling/descrambling system should have two modes. In a first mode, each packet must be descrambled prior to applying any change to the MSC section data as the data of the MSC section of the packet does contribute to the scrambling/descrambling function of the rest of the packet. The first mode is termed an MSC data dependent MDD) mode. In the MDD mode, a change of data in the MSC section (Process ID (PED) or program clock reference (PCR) contained in the header or adaptation fields) of a scrambled packet generally adversely impacts descrambling, which although is desirable in some environments, in other environments, particularly in Headend applications, the MDD mode inhibits use of the scrambling/descrambling system. Therefore, in a second mode, changes to the data of the MSC section can be made to a scrambled packet as the data of MSC section does not contribute to the scrambling/descrambling function. In other words, in the second mode, the packet does not need to be descrambled in order to change the MSC section. The second mode is termed an MSC data independent (MDI) mode. In the MDI mode, a change of the data of the MSC section, for example, but not limited to, for remultiplexing, may be introduced without scrambling/descrambling the packet. In the MDD mode each packet must be descrambled prior to application of any change to the MSC section; and as such preferably necessitates special authorization. The MDD mode is particularly useful for commercial applications where it is sought to intentionally prevent, for example: remuxing of scrambled packets; splicing and insertion of scrambled packets; and changing certain fields like PCR in scrambled packets. In contrast, the MDI mode is preferably employed when commercially it is desired to have, for example, but not limited to, remuxing of scrambled streams so that changes to the MSC section can be performed on the scrambled packet; in other words, the packet does not have to be descrambled prior to changing the MSC section, for example, but not limited to, changing the PID or other MSC fields.

(j) The scrambling/descrambling system should be simple to implement, and use repeated application of a few basic building blocks.

(k) The scrambling/descrambling system should be robust even for data packets with some regular patterns and the system should limit the possibility of identifying ciphertext patterns.

The above requirements led the inventors to choose AES CBC with Ciphertext Stealing (CTS) as a preferred basic building block of the scrambling/descrambling system of the present invention. However, it will be appreciated by those ordinarily skilled in the art that any other suitable scrambling can be used as a basic building block of the scrambling/descrambling system.

The present invention, in preferred embodiments thereof, performs scrambling/descrambling of a packet based on an Initial Value (IV) which is a function of: at least some of the data of the MSC section of the packet; and/or a data independent characteristic (such as length) of the packet; and/or a data independent characteristic (such as length) of the MSC section or the adaptation field of the packet being processed.

The system of the present invention, in preferred embodiments thereof, includes a content protection system for a digital content distribution system for scrambling and/or descrambling packets. Each of the packets typically has a must stay clear (MSC) section generally used for packet management such as routing and demultiplexing. The MSC section is always kept in the clear (in other words, the MSC section is never scrambled).

The system typically includes a scrambling/descrambling device, or emulation thereof, typically adapted to scramble and/or descramble the packets typically based on an Initial Value and a Control Word. The term "Control Word (CW)" as used in the specification and claims refers to the cryptographic Key, or "Key" that controls the scrambling/descrambling of the A/V content and/or data. Additionally, the terms "scrambling" and "encrypting" as used in the specification and claims are synonymous, in all grammatical forms thereof. Similarly, the terms "descrambling" and "decrypting" as used in the specification and claims are synonymous, in all grammatical forms thereof. In accordance with a most preferred embodiment of the present invention, the Initial Value used for scrambling/descrambling each packet in the MDI mode is a function of a data independent characteristic of the packet being processed, and in particular the MSC section of the packet being processed, for example, but not limited to, the length of the packet and/or the length of the MSC section.

In the MDD mode, the Initial Value for each packet is a function of the data of the MSC (the actual bits of the MSC) of the packet being scrambled and/or descrambled. Therefore, the MDD mode is particularly useful for applications which require limiting unauthorized manipulations of a scrambled stream. Unauthorized manipulations include, for example, remultiplexing, combining scrambled single program transport streams into a multiple program transport stream, or changing specific MSC parameters in the scrambled stream. Preferably, the Initial Value for each of the packets is a function of a set of data of the MSC section, the set of data excluding one or more bits of the MSC section. In other words, certain bits of the MSC section are masked from being used for the Initial Value. The exclusion or masking is typically defined based upon the location of predetermined bits of the MSC or in accordance with the scheme of the transport stream, for example, but not limited to, the MPEG-2 scheme. For example, the bit(s) to be excluded are known through specification of the type of fields to be excluded, and parsing the actual data in the MSC in order to locate the desired fields.

There is thus provided in accordance with a preferred embodiment of the present invention a system for scrambling/descrambling packets of a stream of content, each of the packets having a must stay clear (MSC) section which is always kept in the clear, the system including an input handler including a receiving module to receive the stream, a characteristic analyzer to analyze the stream in order to determine at least one data independent characteristic of each of the packets, and a scrambling/descrambling device operationally associated with the input handler, the scrambling/descrambling device including a receiving module to receive the at least one data independent characteristic for each of the packets from the input handler, and an Initial Value module to determine an Initial Value for each of the packets as a function of the at least one data independent, characteristic of one of the packets being processed, wherein the scrambling/descrambling device is adapted to at least one of scramble and descramble the packets based on the Initial Value and a Control Word.

Further in accordance with a preferred embodiment of the present invention, the system includes an adaptation field manager for introducing entropy into the Initial Value of the packets by performing one of artificially creating an adaptation field in at least some of the packets, and enlarging an existing adaptation field of the at least some packets, such that a length of the adaptation field of the packets is selectable, wherein the adaptation field forms part of the MSC section, the at least one independent characteristic being at least one of a length of the MSC section and the length of the adaptation field.

Still further in accordance with a preferred embodiment of the present invention the at least one data independent characteristic is a length of the packets.

Additionally in accordance with a preferred embodiment of the present invention the characteristic analyzer is adapted to analyze at least one data independent characteristic of the MSC section of each of the packets, and the Initial Value for each of the packets is a function of the at least one data independent characteristic of the MSC section of the one packet being processed.

Moreover in accordance with a preferred embodiment of the present invention the at least one data independent characteristic of the MSC section is a length of the MSC section.

Further in accordance with a preferred embodiment of the present invention the MSC section includes an adaptation field, the characteristic handler is adapted to analyze at least one data independent characteristic the adaptation field, and the Initial Value for each of the packets is a function of at least one data independent characteristic of the adaptation field of the one packet being processed.

Still further in accordance with a preferred embodiment of the present invention the Initial Value for each of the packets is also a function of the data content of the MSC section of the-one packet being processed.

There is also provided in accordance with still another preferred embodiment of the present invention a system for scrambling/descrambling packets of a stream of content, each of the packets having a must stay clear (MSC) section which is always kept in the clear, the system including an input handler including a receiving module to receive the stream, and a mask module to create, for each of the packets, a data mask which includes all data of the MSC section except for at least one bit of data of the MSC section, and a scrambling/descrambling device operationally associated with the input handler, the scrambling/descrambling device including a receiving module to receive the data mask for each of the packets from the input handler, and an Initial Value module to determine an Initial Value for each of the packets as a function of the data mask of one of the packets being processed such that the Initial Value is not a function of the at least one bit of data of the MSC section of the one packet being processed, the scrambling/descrambling device being adapted to at least one of scramble and descramble the packets based on the Initial Value and a Control Word.

Additionally in accordance with a preferred embodiment of the present invention the at least one bit is location dependent.

Moreover in accordance with a preferred embodiment of the present invention the at least one bit is a first bit of a second byte of the MSC section.

There is also provided in accordance with still another preferred embodiment of the present invention a system for scrambling/descrambling packets of a stream of content, the stream being associated with a scheme, the system including an input handler including a receiving module to receive the stream, and a scheme analyzer to determine the scheme based on a data form of at least one of the packets, and a scrambling/descrambling device to at least one of scramble and descramble the packets based on the scheme.

Further in accordance with a preferred embodiment of the present invention, the system includes an Initial Value module to determine an Initial Value for each of the packets based on the scheme, wherein the scrambling/descrambling device is adapted to at least one of scramble and descramble each of the packets based on the Initial Value and a Control Word.

Still further in accordance with a preferred embodiment of the present invention each of the packets has a must stay clear (MSC) section which is always kept in the clear, the system further including a mask module to create, for each of the packets, a data mask which includes all data of the MSC section except for at least one bit of data of the MSC section, the data mask being based on the scheme, the Initial Value module being adapted to determine the Initial Value for each of the packets as a function of the data mask of one of the packets being processed such that the Initial Value is not a function of the at least one bit of data of the MSC section of the one packet being processed.

There is also provided in accordance with still another preferred embodiment of the present invention a method for scrambling/descrambling packets of a stream of content, each of the packets having a must stay clear (MSC) section which is always kept in the clear, the method including receiving the stream, analyzing the stream in order to determine at least one data independent characteristic of each of the packets, determine an Initial Value for each of the packets as a function of the at least one data independent characteristic of one of the packets being processed, and at least one of scrambling and descrambling the packets based on the Initial Value and a Control Word.

Additionally in accordance with a preferred embodiment of the present invention, the method includes performing one of artificially creating an adaptation field in at least some of the packets and enlarging an existing adaptation field of the at least some packets, such that a length of the adaptation field of the packets is selectable, the adaptation field forming part of the MSC section, the at least one independent characteristic being at least one of a length of the MSC section and the length of the adaptation field.

Moreover in accordance with a preferred embodiment of the present invention the at least one data independent characteristic is a length of the one packet being processed.

Further in accordance with a preferred embodiment of the present invention the analyzing is performed by analyzing at least one data independent characteristic of the MSC section of each of the packets, and the determining is performed by determining the Initial Value for each of the packets as a function of the at least one data independent characteristic of the MSC section of the one packet being processed.

Still further in accordance with a preferred embodiment of the present invention the at least one data independent characteristic of the MSC section is a length of the MSC section of the one packet being processed.

Additionally in accordance with a preferred embodiment of the present invention the MSC section includes an adaptation field, the analyzing is performed by analyzing at least one data independent characteristic the adaptation field, and the determining is performed by determining the Initial Value for each of the packets as a function of at least one data independent characteristic of the adaptation field of the one packet being processed.

Moreover in accordance with a preferred embodiment of the present invention the determining also includes determining the Initial Value for each of the packets as a function of the data content of the MSC section of the one packet being processed.

There is also provided in accordance with still another preferred embodiment of the present invention a method for scrambling/descrambling packets of a stream of content, each of the packets having a must stay clear (MSC) section which is always kept in the clear, the method including receiving the stream, creating, for each of the packets, a data mask which includes all data of the MSC section except for at least one bit of data of the MSC section, determine an Initial Value for each of the packets as a function of the data mask of one of the packets being processed such that the Initial Value is not a function of the at least one bit of data of the MSC section of the one packet being processed, and at least one of scrambling and descrambling the packets based on the Initial Value and a Control Word.

Further in accordance with a preferred embodiment of the present invention the at least one bit is location dependent.

Still further in accordance with a preferred embodiment of the present invention the at least one bit is a first bit of a second byte of the MSC section.

There is also provided in accordance with still another preferred embodiment of the present invention a method for scrambling/descrambling packets of a stream of content, the stream being associated with a scheme, the method including receiving the stream, determining the scheme based on a data form of at least one of the packets, and scrambling/descrambling the packets based on the scheme.

Additionally in accordance with a preferred embodiment of the present invention, the method includes determining an Initial Value for each of the packets based on the scheme, wherein the scrambling/descrambling for each of the packets is based on the Initial Value and a Control Word.

Moreover in accordance with a preferred embodiment of the present invention each of the packets has a must stay clear (MSC) section which is always kept in the clear, the method further including creating, for each of the packets, a data mask which includes all data of the MSC section except for at least one bit of data of the MSC section, the data mask being based on the scheme, the Initial Value for each of the packets being a function of the data mask of one of the packets being processed such that the Initial Value is not a function of the at least one bit of data of the MSC section of the one packet being processed.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

The present invention, in preferred embodiments thereof, seeks to provide an improved scrambling/descrambling system for a digital content protection system. The term "content" is defined herein to include, but is not limited to, audio and/or video and/or data content.

The requirements listed in the background section led the inventors to choose AES CBC with Ciphertext Stealing (CTS) as a preferred basic building block of the scrambling/descrambling system of the present invention. Therefore, the system of the present invention is generally described with reference to AES CBC. However, it will be appreciated by those ordinarily skilled in the art that any other suitable scrambling can be used as a basic building block of the scrambling/descrambling system.

Figure 1:
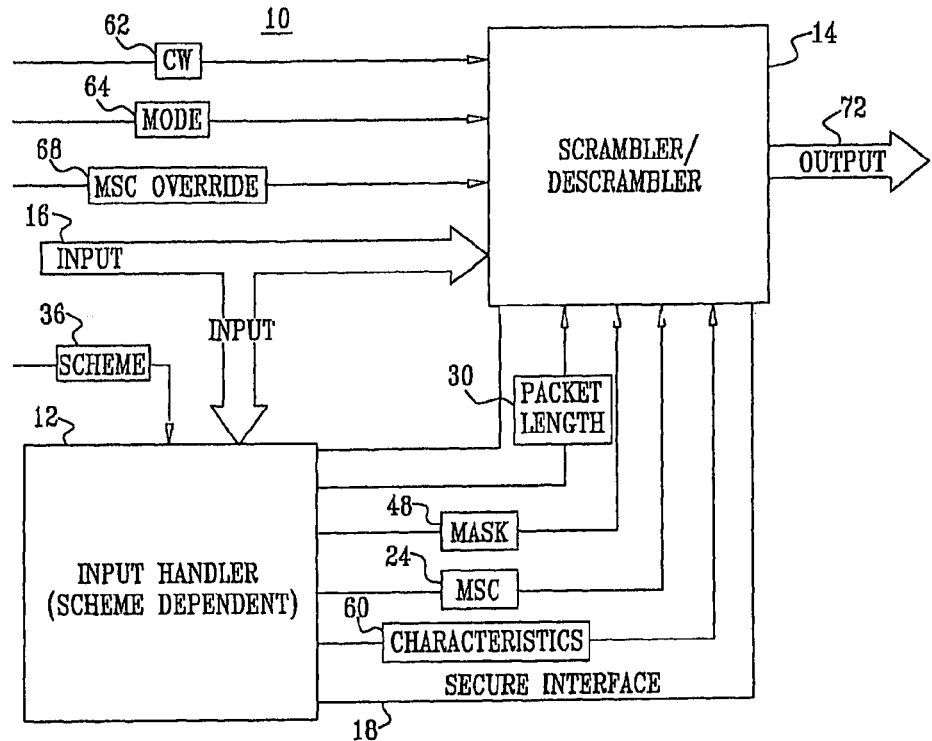
FIG. 1 is a simplified block diagram of a system constructed and operative in accordance with a preferred embodiment of the present invention.
Figure 2:
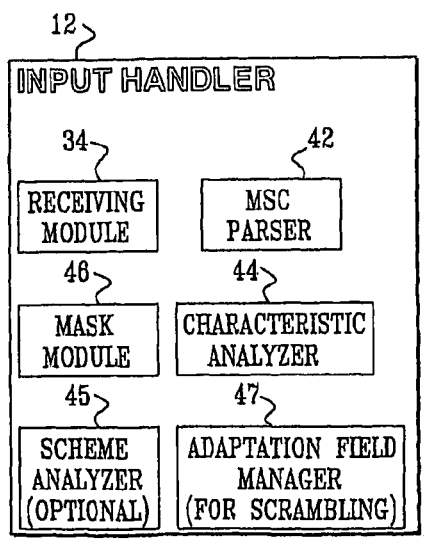
FIG. 2 is a simplified block diagram of a preferred implementation of an input handler of the system of FIG. 1.
Figure 3:
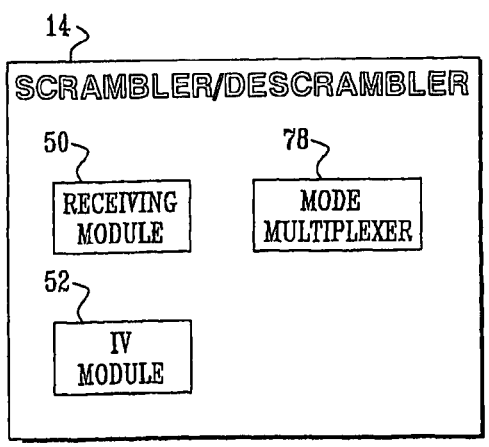
FIG. 3 is a simplified block diagram of a preferred implementation of a scrambling/descrambling device of the system of FIG. 1.
Figure 4:
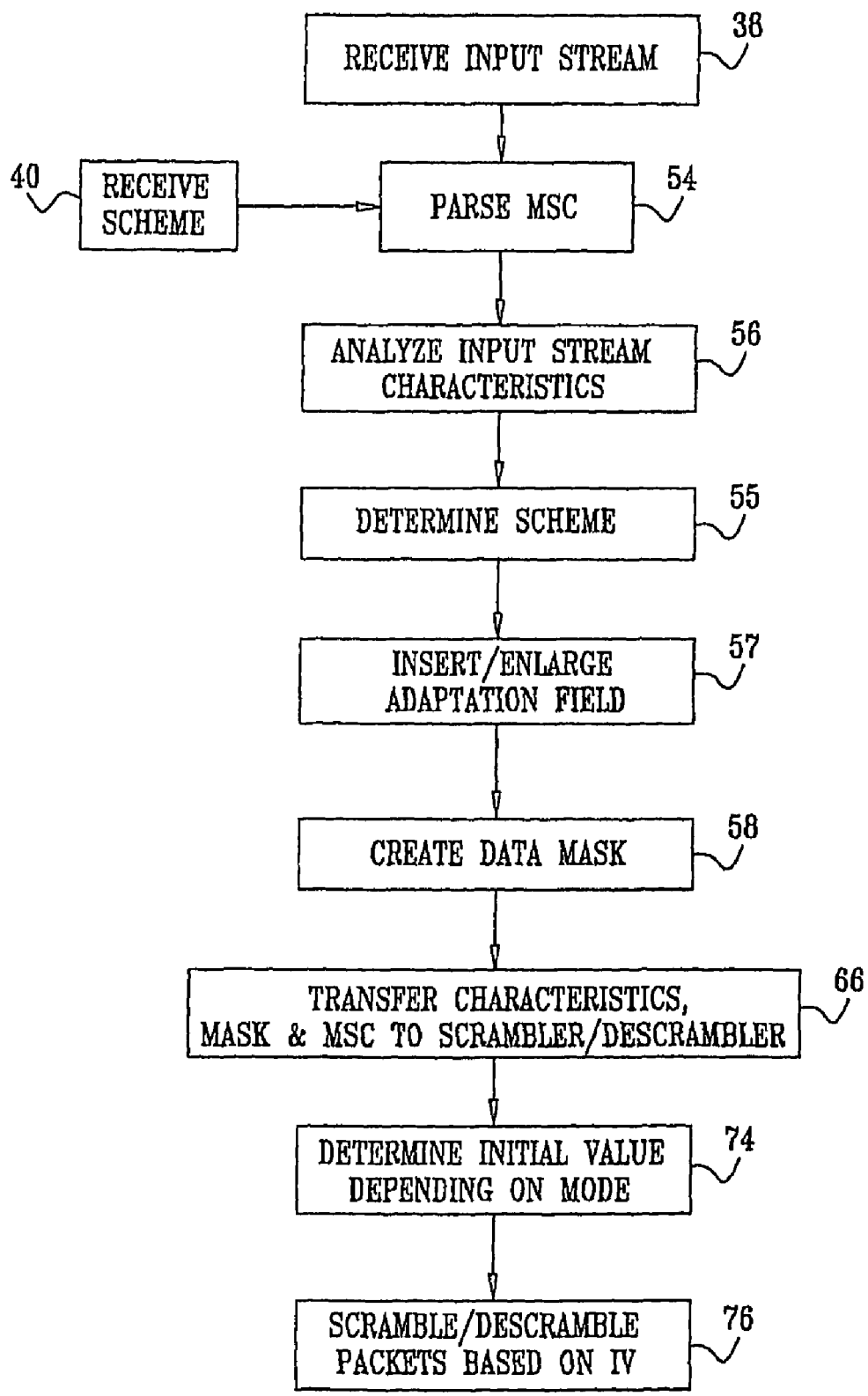
FIG. 4 is a simplified flow chart illustrating a preferred method of operation of the system of FIG. 1.

Reference is now made to FIGS. 1 to 4. FIG. 1 is a simplified block diagram of a system 10 constructed and operative in accordance with a preferred embodiment of the present invention. FIG. 2 is a simplified block diagram of a preferred implementation of an input handler 12 of the system 10 of FIG. 1. FIG. 3 is a simplified block diagram of a preferred implementation of a scrambling/descrambling device 14 of the system 10 of FIG. 1. FIG. 4 is a simplified flow chart illustrating a preferred method of operation of the system 10 of FIG. 1. The system 10 is preferably adapted to scramble/descramble packets of a stream of content 16. The system 10 typically includes the input handler 12, the scrambling/descrambling device 14 and a secure interface 18. The secure interface 18 preferably interfaces between the input handler 12 and the scrambling/descrambling device 14. The stream 16 is generally inputted to both the input handler 12 and the scrambling/descrambling device 14. The term "secure" as used in the specification and claims is defined as tamper resistant such that the data flowing between the input handler 12 and the scrambling/descrambling device 14 is tamper resistant against modification by a hacker.

Figure 5:
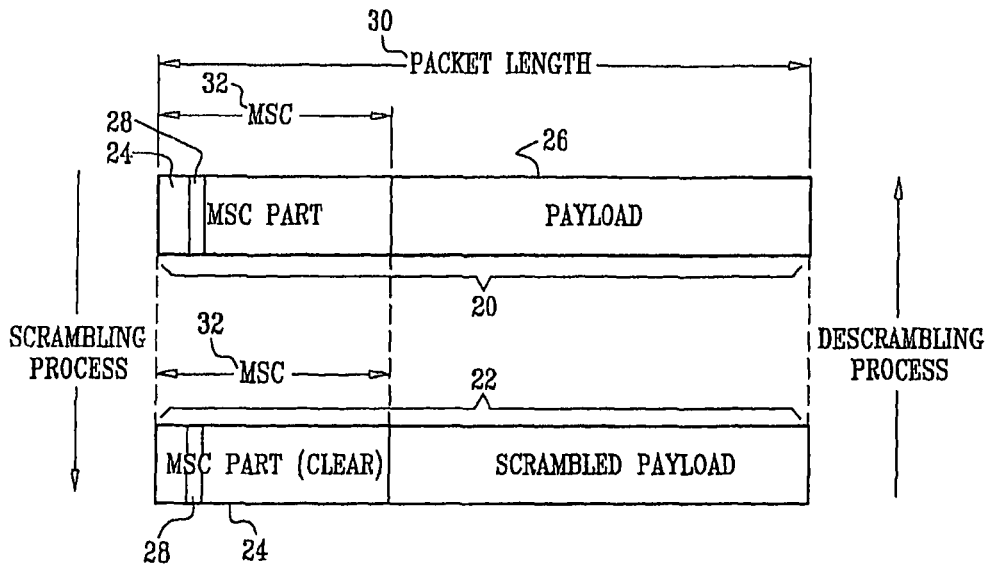
FIG. 5 is a simplified view of a packet in a unscrambled packet and a scrambled packet processed by the system of FIG. 1.

Reference is now made to FIG. 5, which is a simplified view of an unscrambled packet 20 and a scrambled packet 22 of the stream 16 processed by the system 10 of FIG. 1. The unscrambled packet 20 typically includes an MSC section 24 and a payload 26. The unscrambled packet 20 and the scrambled packet 22 have a packet length 30. The MSC section 24 also generally has a length 32. The MSC section 24 is always kept-in the clear. In other words, the MSC section 24 is never sent or stored scrambled so even in the scrambled packet 22, the MSC section 24 is "in the clear". The MSC section 24 typically includes an adaptation field 28, which is also always kept in the clear. The MSC section 24 typically includes a header (a number of bytes at the beginning) of the packet 20, 22 that must stay clear. By way of example, an MPEG-2 packet has a packet length of 188 bytes and an MSC section of 4 bytes plus optional adaptation fields.

Reference is again made to FIGS. 1 to 4 in addition to FIG. 5. The input handler 12 is typically part of the SVP transport engine. The input handler 12 preferably includes a receiving module 34 to receive the stream 16 (block 38). The input handler 12 is also typically adapted to receive a signal 36, informing the input handler 12 of the scheme of the stream 16, so that the input handler 12 operates in accordance with the signaled scheme (block 40), for example, but not limited to, determining a data mark 48, as will be described below in more detail.

The input handler 12 also preferably includes an MSC parser 42, a characteristic analyzer 44, a scheme analyzer 45, an adaptation field manager 47, and a mask module 46.

The MSC parser 42 is preferably adapted to parse the packet 20, 22 in order to identify the MSC section 24 and, if necessary, the adaptation field 28 (block 54). The packet 20, 22 typically includes one or more bytes (depending on the transport scheme) indicating the location and size of the MSC section 24.

The characteristic analyzer 44 is preferably adapted to analyze the stream 16 in order to determine one or more data independent characteristics 60 of: each of the packets 20, 22; and/or the MSC sections 24 of each of the packets 20, 22; and/or the adaptation fields 28 of each of the MSC sections 24 (block 56). The term "data independent characteristic" used in the specification and claims is defined as a factor which is independent of the data values of the packet 20, 22 (including the MSC section 24 and the adaptation field 28). The data independent characteristics 60 include any suitable data independent characteristic for example, but not limited to, the length 30 of the packet 20, 22, and/or the length 32 of the MSC section 24, and/or the length of the adaptation field 28. If the signal 36 is not used, the scheme analyzer 45 preferably determines the scheme of the stream 16 based on the data form of the packets 20, 22 (block 55). The data form of the packets 20, 22 is preferably determined by the MSC parser 42 and the characteristic analyzer 44, described above. As described above, the data mask 48 is typically a function of the scheme of the stream 16.

For scrambling, for example, but not limited to, when the system 10 is part of a broadcasting Headend or content sourcing device, the adaptation field manager 47 preferably creates an artificial adaptation field in at least some of the packets 20 (if an adaptation field did not exist) or artificially enlarges the existing adaptation field 28 of at least some of the packets (block 57) such that the length of the adaptation field of the packets 20, and therefore the length 32 of the MSC section 24, is selectable. The reason for artificially creating/enlarging the adaptation field 28 is to introduce entropy into the Initial Values of the packets 20, as will be explained below in more detail with reference to the scrambling/descrambling device 14.

The mask module 46 is preferably adapted to create, for each of the packets 20, 22, the data mask 48, which typically includes all data of the MSC section 24 except for one or more bits of data of the MSC section 24 (block 58). Masking is described in more detail below with reference to the scrambling/descrambling device 14 while operating in the MDD mode. As described above, the data mask 48 is typically a function of the scheme of the stream 16.

The scrambling/descrambling device 14 is generally operationally associated with the input handler 12 via the secure interface 18. The input handler 12, the scrambling/descrambling device 14 and the secure interface 18 are preferably adapted to be tamper resistant against modification of the MSC section 24 on the scrambling side that leaves the whole packet 20 left in the clear. For example, a hacker may try to amend the length 32 of the MSC section 24 so that the length 32 of the MSC section 24 is the length 30 of the packet 20, thereby leaving the whole packet 20 in the clear even after scrambling, as the MSC section 24 is now the whole packet.

The scrambling/descrambling device 14 preferably performs the scrambling/descrambling function of the system 10. The scrambling/descrambling device 14 generally has sub modules including a receiving module 50, an Initial Value module 52 and a mode multiplexer 78.

The receiving module 50 is preferably adapted to receive the data independent characteristics 60, the data mask 48, the MSC section 24, and the packet length 30, for each of the packets 20, 22, from the input handler 12 (block 66). The packet length 30, in bytes, generally needs to be known by the scrambling/descrambling device 14 for initialization of the scrambling/descrambling process. It should be noted that certain schemes, for example, but not limited to, the MPEG-2 scheme, the packet length 30 is constant for all of the packets 20, 22. However, it will be appreciated by those ordinarily skilled in the art that other schemes may have non-constant packet lengths, for example, but not limited to, Internet Protocol packets.

Another input to the scrambling/descrambling device 14 typically includes a plurality of Control Words 62. Each of the Control Words 62 is typically shared by a group of the packets 20, 22.

A mode of operation 64 of the system 10 is also an input to the scrambling/descrambling device 14 for use by the mode multiplexer 78. The mode of operation 64 is generally used to change a mode control flag (not shown) which instructs the mode multiplexer 78 of the scrambling/descrambling device 14 to operate in the MDI mode or the MDD mode. The mode control flag is preferably activated in a secure manner provided by the overall Content Protection System so that, for example, if the system is currently operating in the MDD mode then hackers are prevented from changing the operation of the system 10 to the MDI mode. By way of a first example, the mode control flag is activated in a secure manner by specifying the required mode in a cryptographically protected content-specific control datagram and delivering the datagram to the scrambling/descrambling device 14. By way of a second example, the mode control flag is activated in a secure manner by an SVP control block securely passing the required mode along with the control word to the scrambling/descrambling device 14.

Figure 6:
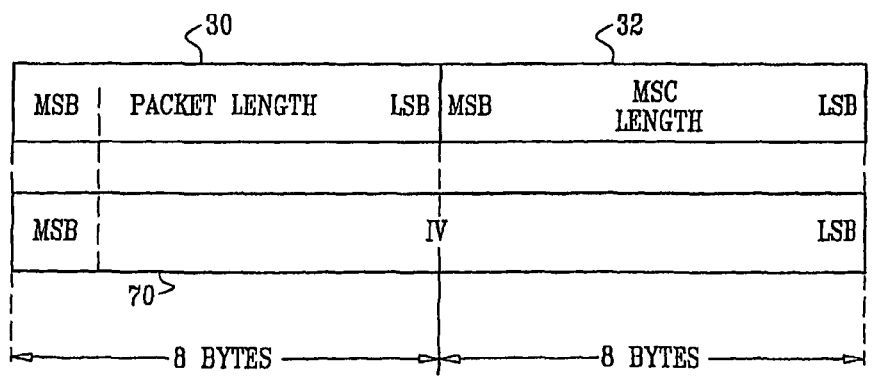
FIG. 6 is a simplified view of an Initial Value for use in the system of FIG. 1.

In additional to FIGS. 1 to 5, reference is now also made to FIG. 6, which is a simplified view of an Initial Value 70 for use in the system of FIG. 1.

An additional, optional, input to the scrambling/descrambling device 14 is an MSC override 68 input. If the MSC override 68 input is equal to one, the scrambling/descrambling device 14 typically disregards the MSC section 24 received from the input handler 12 and forces the length 32 of the MSC section 24 to zero, both for use in calculating the Initial Value 70 and in the actual portion of the packet 20 being scrambled so that the whole packet 20 is scrambled. The MSC override feature is preferably not used with the MPEG-2 scheme.

In the MDI mode, the Initial Value module 52 is preferably adapted to determine the Initial Value 70 for each of the packets 20, 22 as a function of the data independent characteristics 60 of: the packet 20, 22 being processed; and/or the MSC section 24 of the packet 20, 22 being processed; and/or the adaptation field 28 of the MSC section 24 of the packet 20, 22 being processed (block 74). In scrambling, when the initial value 70 is determined as a function of the length of the adaptation field 28 and/or the length 32 of the MSC section 24, entropy is introduced into the initial value 70 by artificially changing the length of the adaptation field 28 of at least some of the packets 20 by the adaptation field manager 47, as described above. The scrambling/descrambling device 14 is preferably adapted to scramble/descramble the packets 20, 22 of the stream 16 based on the Initial Values 70 and the Control Words 62 of the packets 20, 22 thereby producing an output stream 72 (block 76).

It should be noted that when entropy is introduced into the initial values 70 by artificially manipulating the adaptation fields of the packets 20, the application which extracts the payload 26 from the packets 20 automatically extracts the payload 26 (excluding the MSC section 24) from the packet 22 as defined by the transport scheme (for example, but not limited to, MPEG-2). In other words, the application which extracts the payload does not need to be amended in order to handle initial value entropy created by the system of the present invention.

In the MDD mode, the Initial Value module 52 is preferably adapted to determine the Initial Value 70 for each of the packets 20, 22 as a function of the data mask 48 of the packet 20, 22 being processed, such that the Initial Value 70 is not a function of the one or more bits of data of the MSC section 24 excluded by the data mask 48 of the packet 20, 22 being processed (block 74). In other words, masking is a way to eliminate portions of the MSC section 24 from being used in forming the Initial Value 70. However, it should be noted that the whole MSC section 24, even including the portions masked out by the data mask 48, is preferably included in the output stream 72.

Therefore, masking typically allows designating bits in the MSC section 24 that may be modified without requiring re-scrambling while in the MDD mode.

The bit(s) excluded by the data mask 48 are preferably location dependent, such that the masking is typically performed based upon the location of predetermined bit(s) of the MSC section 24 or in accordance with the scheme of the transport stream, e.g. MPEG-2 scheme. By way of a non-limiting example, the bit(s) to be excluded are determined by specifying the type of fields to be excluded, and parsing the actual data in the MSC section 24 in order to locate the desired-field type.

In the MPEG-2 scheme, the first bit of the second byte of the MSC section 24 is typically a transport error indicator, which may change during transport of the packet 20, 22 depending on the transport status. Therefore, it is preferable to mask the first bit of the second byte from being used in the Initial Value 70 when using the MPEG-2 scheme.

As described above, the data mask 48 is typically a function of the scheme of the stream 16. Additionally, the initial values 70 used in scrambling/descrambling the packets 20, 22 are typically a function of the data mask 48 in the MDD mode. Therefore, in the MDD mode, the initial values 70 and also the scrambling/descrambling of the packets 20, 22 by scrambling/descrambling device 14 is typically a function of the scheme of the stream 16.

In accordance with a first alternative preferred embodiment of the present invention, in the MDD mode, the Initial Value module 52 is adapted to determine the Initial Value 70 for each of the packets 20, 22 as a function of the data independent characteristics 60 as well as the data content of the MSC section 24, wherein none of the data content of the MSC section 24 is explicitly excluded from being used in the Initial Value 70.

In accordance with a second alternative preferred embodiment of the present invention, in the MDD mode, the Initial Value module 52 is adapted to determine the Initial Value 70 for each of the packets 20, 22 as a function of the data independent characteristics 60 and the data mask 48 of the packet 20, 22 being processed.

The system 10 is typically implemented by a silicon vendor as part of an SVP chip content-processing component, with Control Words being supplied by an SVP Kernel.

Reference is now made to FIG. 6, which is a simplified view of a preferred example of the Initial Value 70 for use in the system 10 of FIG. 1. The Initial Value 70 is based on the packet length 30 (in the most significant 64 bits of the Initial Value 70) and the length 32 of the MSC section 24 (in the least significant 64 bits of the Initial Value 70). For MPEG-2, both the packet length 30 and the length 32 of the MSC section 24 are typically one byte each. Therefore, for MPEG-2 typically only two bytes of the Initial Value 70 are non-zero. In FIG. 6, MSB denotes "most significant bits" and LSB denotes "least significant bits".

Figure 7:
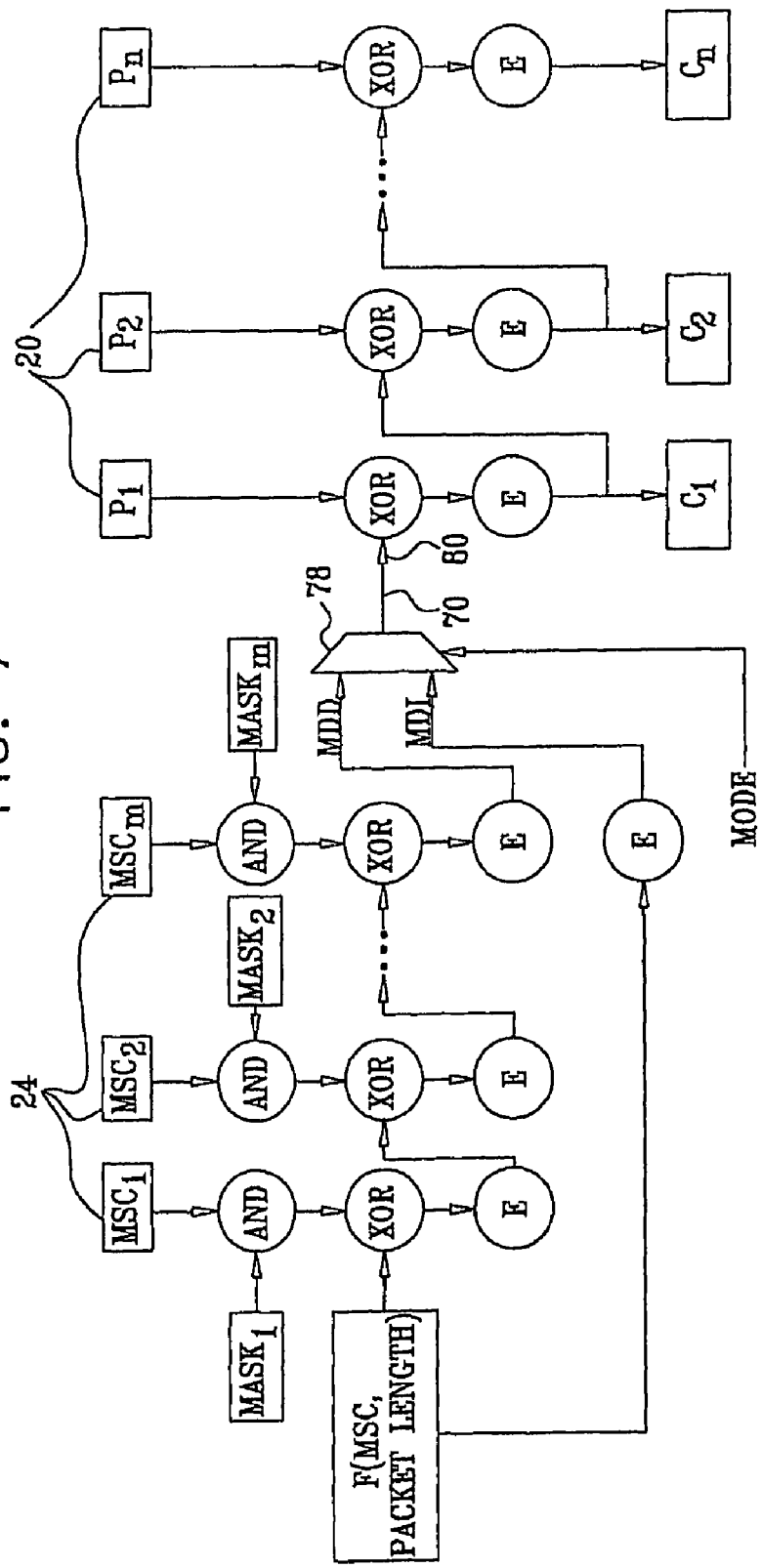
FIG. 7 is a flow chart of a preferred pure CBC scrambling process for use with the system of FIG. 1.
Figure 8:
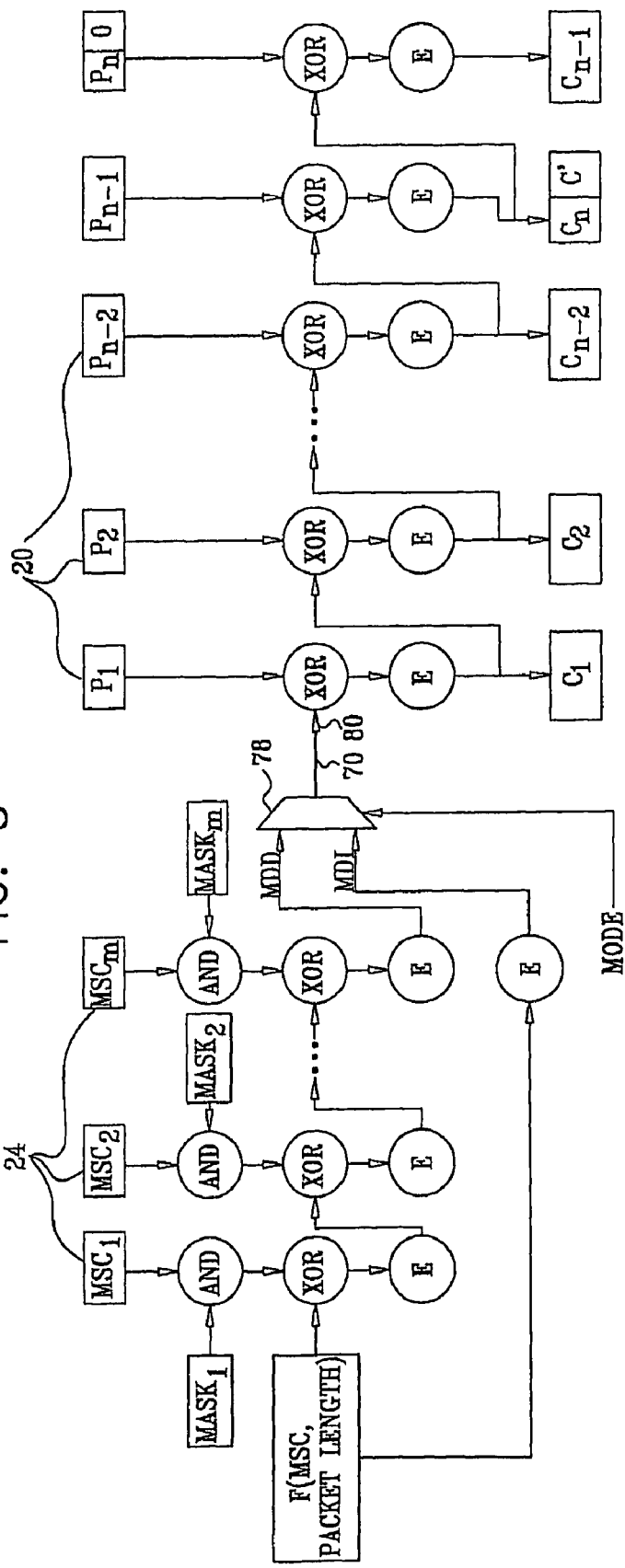
FIG. 8 is a flow chart of a preferred CBC with ciphertext stealing scrambling process for use with the system of FIG. 1.
Figure 9:
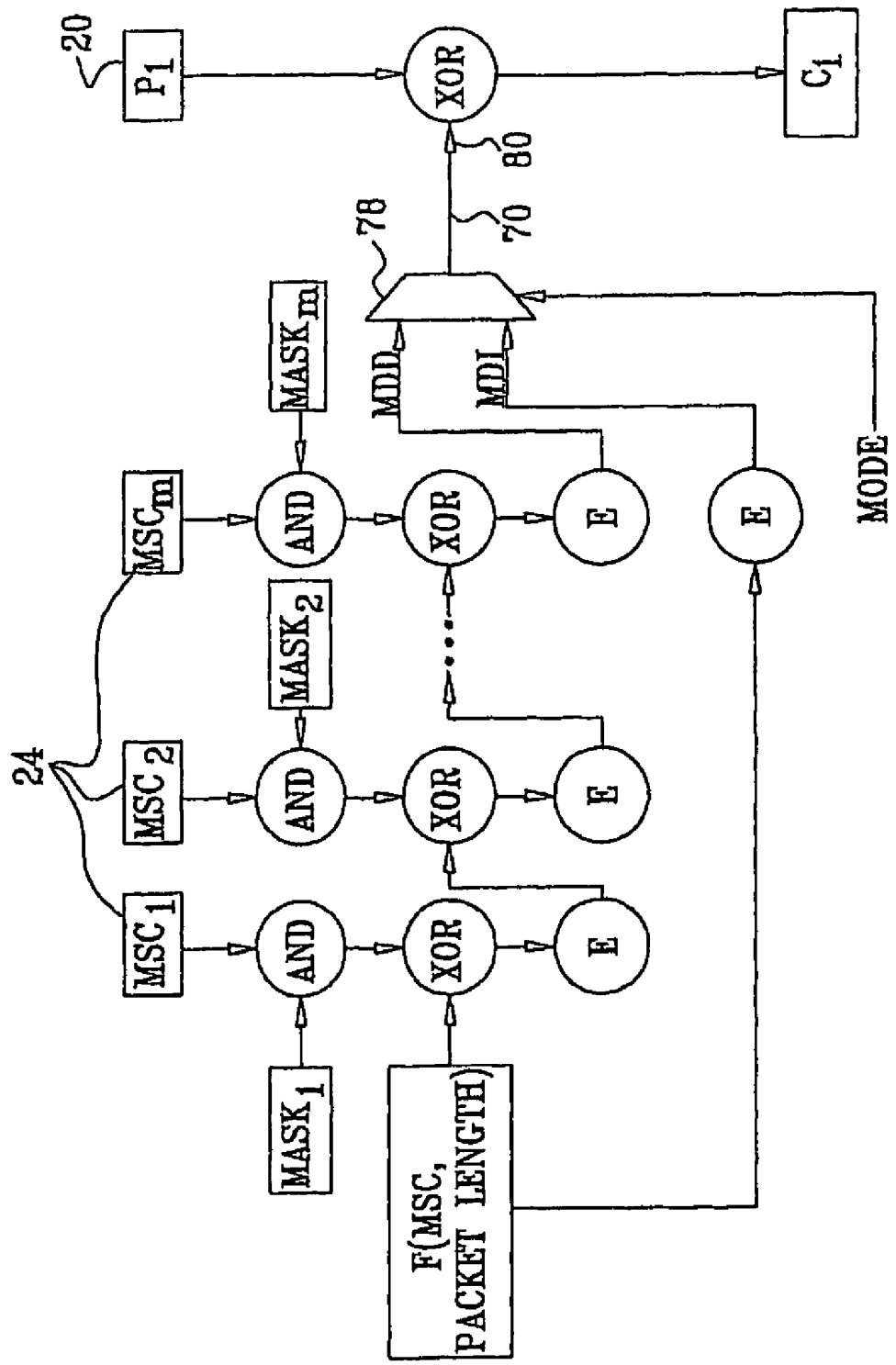
FIG. 9 is a flow chart of a preferred short solitary block scrambling process for use with the system of FIG. 1.
Figure 10:
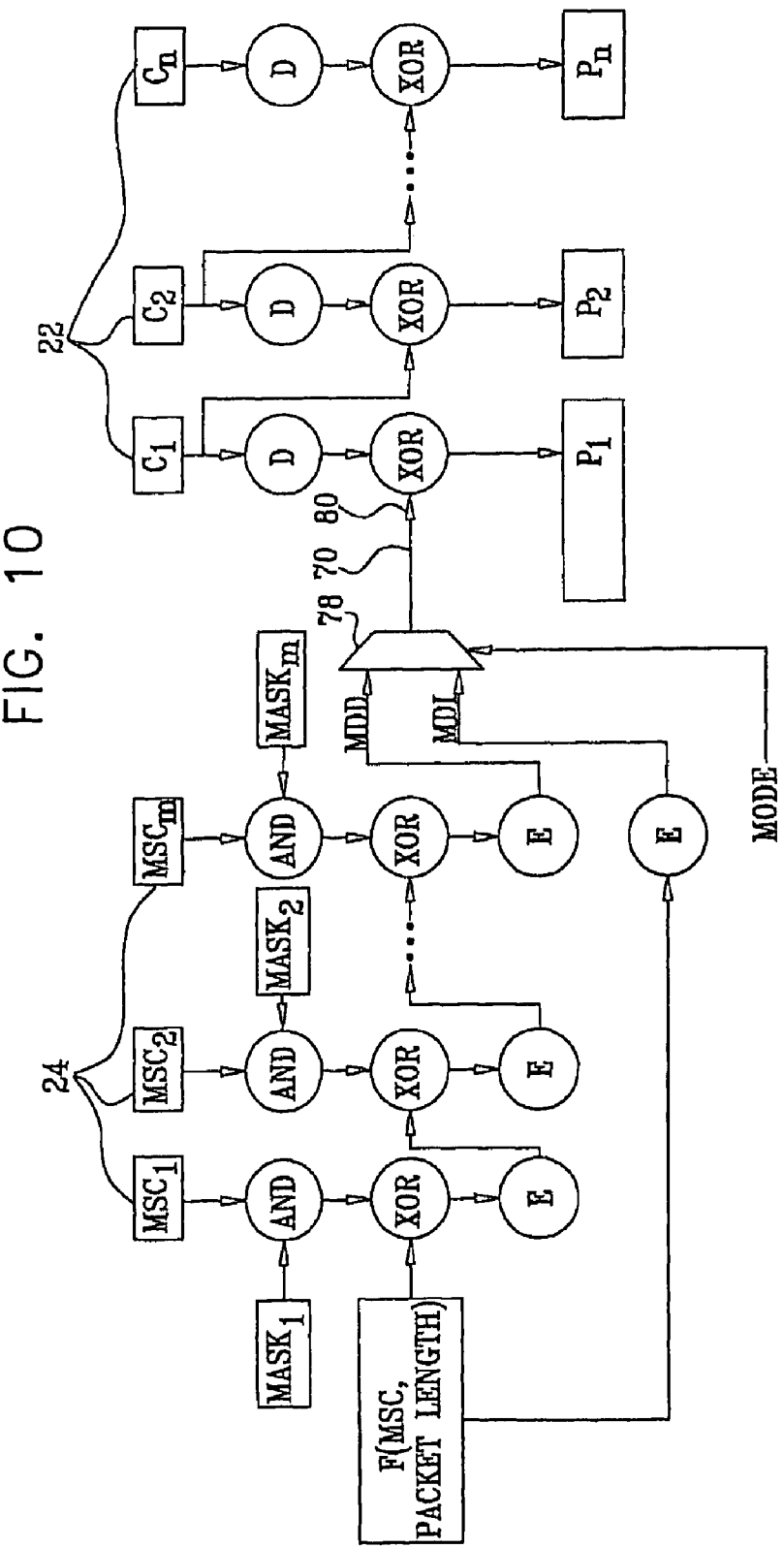
FIG. 10 is a flow chart of a preferred pure CBC descrambling process for use with the system of FIG. 1.
Figure 11:
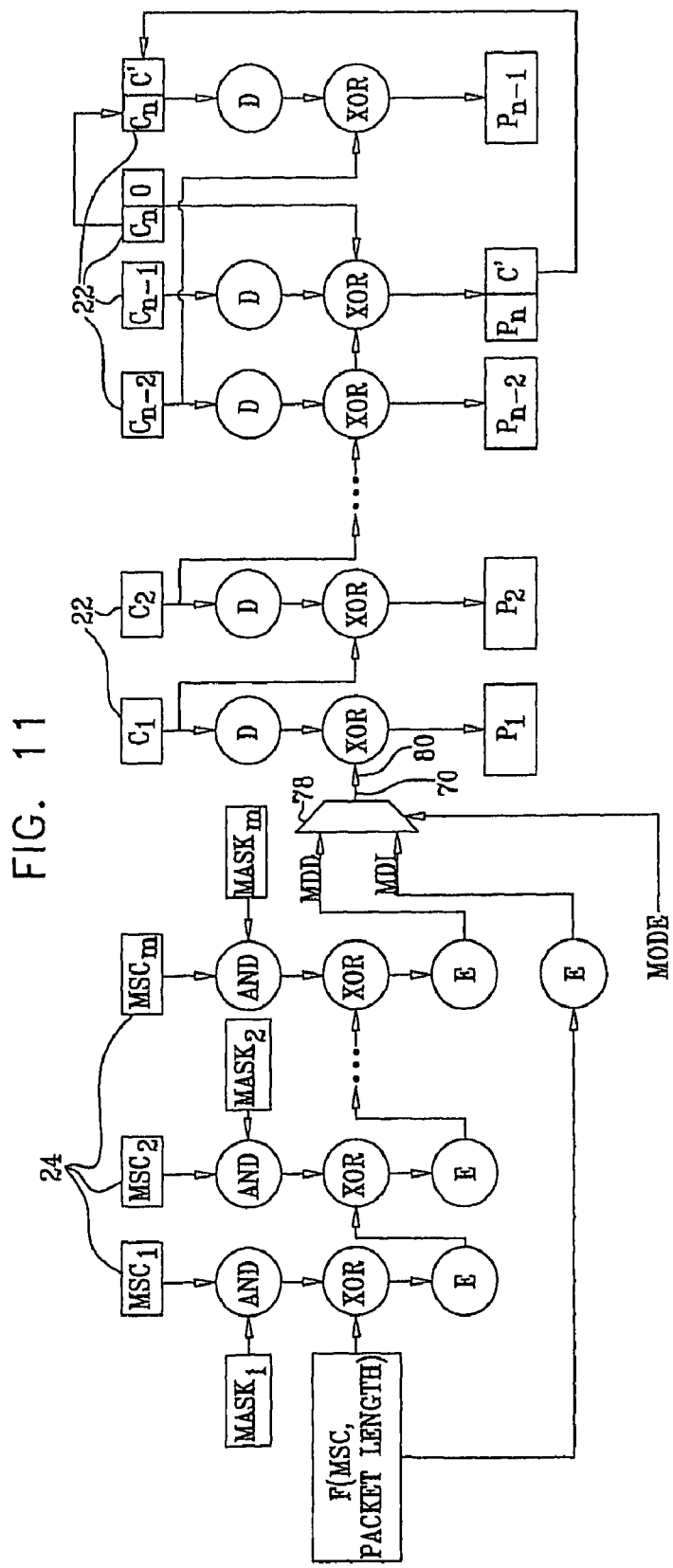
FIG. 11 is a flow chart of a preferred CBC with ciphertext stealing descrambling process for use with the system of FIG. 1.
Figure 12:
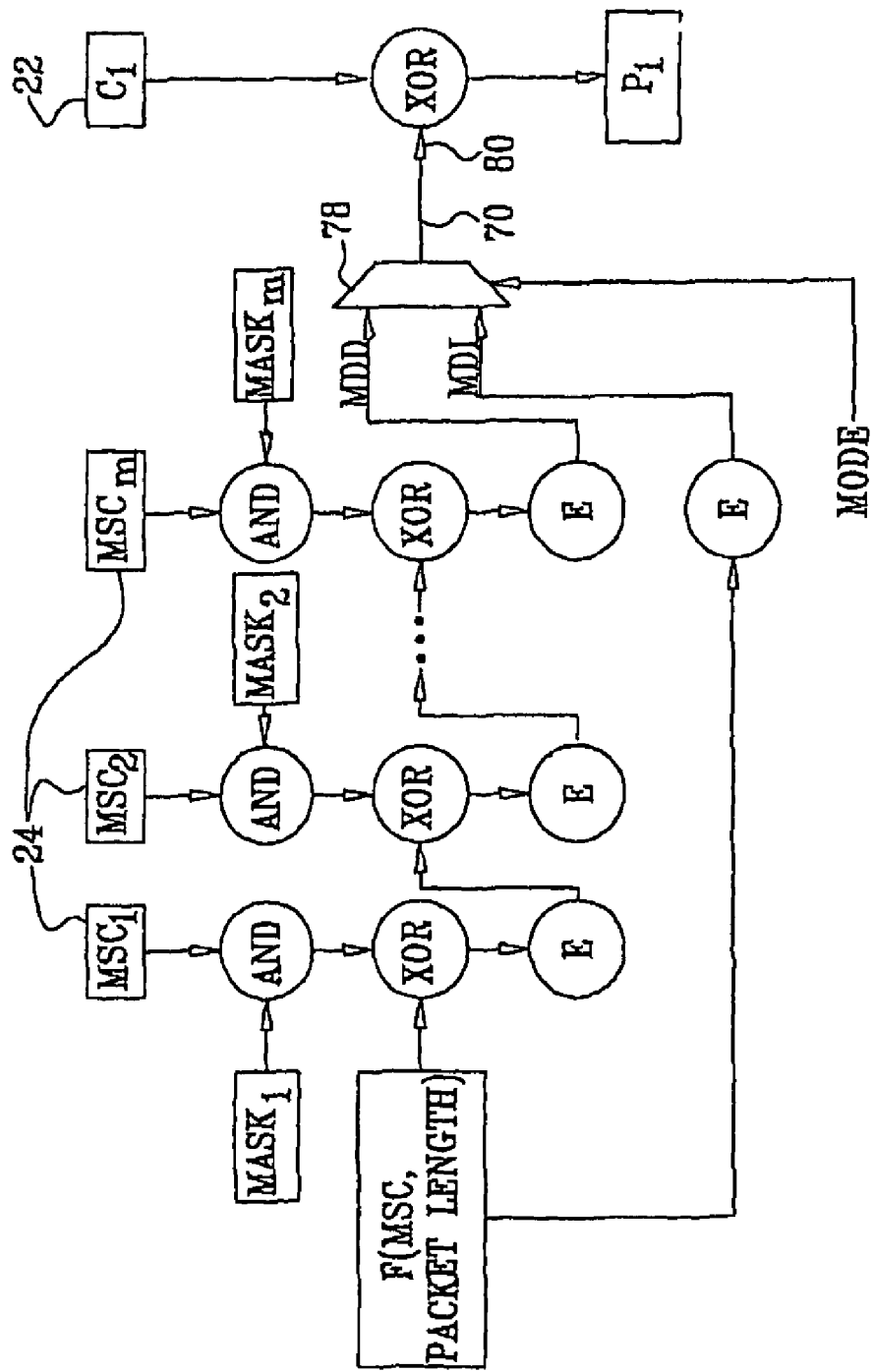
FIG. 12 is a flow chart of a preferred short solitary block descrambling process for use with the system of FIG. 1.

Reference is now made to FIGS. 7 to 12. FIG. 7 is a flow chart of a preferred pure CBC scrambling process for use with the system 10 of FIG. 1. FIG. 8 is a flow chart of a preferred CBC with ciphertext stealing scrambling process for use with the system 10 of FIG. 1. FIG. 9 is a flow chart of a preferred short solitary block scrambling process for use with the system 10 of FIG. 1. FIG. 10 is a flow chart of a preferred pure CBC descrambling process for use with the system 10 of FIG. 1. FIG. 11 is a flow chart of a preferred CBC with ciphertext stealing descrambling process for use with the system 10 of FIG. 1. FIG. 12 is a flow chart of a preferred short solitary block descrambling process for use with the system 10 of FIG. 1.

The following values and notations are used with reference to FIGS. 7 to 12:

"MSC" is the data content of the MSC section;
"MSClength" is the length of the MSC section;
"Mask" is the data mask;
"E" is a standard AES cipher encryption of a 16-byte block using a given 16-byte key CW;
"D" is a standard AES cipher decryption of a 16-byte block using a given 16-byte key CW;
"XOR" is the bitwise XOR operator;
"P" is plaintext;
"C" is ciphertext;
Array indices start from 0 to m for MSC and Mask, and to n for P and C;
"F(MSC, Packet Length)" is a 16 byte Initial Value (V), see FIG. 6.

In the MDD mode, the CBC-MAC WAC being the Message Authentication Code) of the MSC section 24 is preferably used as the Initial Value 70 for the first CBC scrambling/descrambling stage, instead of the classic "fixed IV".

In the MDI mode, the Initial Value 70 for the first CBC scrambling/descrambling stage is preferably a function of the data independent characteristics 60 of the packet 20, 22 and/or the MSC section 24 and/or the adaptation field 28 of the packet 20, 22 being processed.

For consistency, the scrambling function E used in the MDD mode and the MDI mode is preferably the same. Similarly, the descrambling function D used in the MDD mode and the MDI mode is preferably the same.

An output 80 of the mode multiplexer 78, for the packet 20, 22 being processed, is the Initial Value 70 for the same packet 20, 22 to be scrambled/descrambled.

It will be understood that the system 10 according to the present invention may be a suitably programmed processor. Likewise, the invention contemplates software being readable by a processor for executing the method of the invention. The invention further contemplates a machine-readable memory tangibly embodying a program of instructions executable by the machine for executing the method of the invention.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will also be appreciated by persons skilled in the art that the present invention is not limited by what has been particularly shown and described hereinabove. Rather the scope of the invention is defined only by the claims which follow.

What is claimed is:

1. A system for scrambling/descrambling packets of a stream of content, each of the packets having a must stay clear (MSC) section which is always kept in the clear, the system comprising physical computing machinery including:
   an input handler including:
   a receiving module to receive the stream; and
   mask module to create, for each of the packets, a data mask which includes all data of the MSC section except for at least one bit of data of the MSC section; and a scrambling/descrambling device operationally associated with the input handler, the scrambling/descrambling device including:
   a receiving module to receive the data mask for each of the packets from the input handler; and
   an Initial Value module to determine an Initial Value for each of the packets as a function of the data mask of one of the packets being processed such that the Initial Value is not a function of the at least one bit of data of the MSC section of the one packet being processed, the scrambling/descrambling device being adapted to at least one of scramble and descramble the packets based on the Initial Value and a Control Word.

2. The system according to claim 1, wherein the at least one bit is location dependent.

3. The system according to claim 1, wherein the at least one bit is a first bit of a second byte of the MSC section.

4. A system for scrambling/descrambling packets of a stream of content, the stream being associated with a scheme, the system comprising physical computing machine including:
  an input handler including:
   a receiving module to receive the stream; and
   a scheme analyzer to determine the scheme based on a data form of at least one of the packets, each of the packets having a must stay clear (MSC) section which is always kept in the clear;
  a mask module to create, for each of the packets, a data mask which includes all data of the MSC section except for at least one bit of data of the MSC section, the data mask being based on the scheme;
  an Initial Value module to determine an Initial Value for each of the packets based on the scheme, the Initial Value for each of the packets being a function of the data mask of one of the packets being processed such that the Initial Value is not a function of the at least one bit of data of the MSC section of the one packet being processed; and
  a scrambling/descrambling device to at least one of scramble and descramble the packets based on the scheme, wherein the scrambling/descrambling for each of the packets is based on the Initial Value and a Control Word.

5. A method for scrambling/descrambling packets of a stream of content, each of the packets having a must stay clear (MSC) section which is always kept in the clear, the method comprising:
  receiving the stream with physical computing machinery;
  creating, with the physical computin machinery, for each of the packets, a data mask which includes all data of the MSC section except for at least one bit of data of the MSC section;
  determining, with the physical computing machinery, an Initial Value for each of the packets as a function of the data mask of one of the packets being processed such that the Initial Value is not a function of the at least one bit of data of the MSC section of the one packet being processed; and
  at least one of scrambling and descrambling the packets, with the physical computing machinery, based on the Initial Value and a Control Word.

6. The method according to claim 5, wherein the at least one bit is location dependent.

7. The method according to claim 5, wherein the at least one bit is a first bit of a second byte of the MSC section.

8. A method for scrambling/descrambling packets of a stream of content, the stream being associated with a scheme, the method comprising:
  receiving the stream with physical computing machinery;
  determining, with the physical computing machinery, the scheme based on a data form of at least one of the packets, each of the packets having a must stay clear (MSC) section which is always kept in the clear;
  creating, with the physical computing machinery, for each of the packets, a data mask which includes all data of the MSC section except for at least one bit of data of the MSC section, the data mask being based on the scheme;
  determining, with the physical computing machinery, an Initial Value for each of the packets based on the scheme, the Initial Value for each of the packets being a function of the data mask of one of the packets being processed such that the Initial Value is not a function of the at least one bit of data of the MSC section of the one packet being processed; and
  scrambling/descrambling, with the physical computing machinery, the packets based on the scheme, wherein the scrambling/descrambling for each of the packets is based on the Initial Value and a Control Word.

9. A system for scrambling/descrambling packets of a stream of content, each of the packets having a must stay clear (MSC) section which is always kept in the clear, the system comprising:
  means for receiving the stream;
  means for analyzing the stream in order to determine at least one data independent characteristic of each of the packets;
  means for receiving the at least one data independent characteristic for each of the packets;
  means for determining an Initial Value for each of the packets as a function of the at least one data independent characteristic of one of the packets being processed;
  means for introducing entropy into the Initial Value of the packets by performing one of:
   artificially creating an adaptation field in at least some of the packets; and
   enlarging an existing adaptation field of the at least some packets, such that a length of the adaptation field of the packets is selectable, wherein the adaptation field forms part of the MSC section, the at least one independent characteristic being at least one of a length of the MSC section and the length of the adaptation field; and
  means for scrambling/descrambling the packets based on the Initial Value and a Control Word.

10. A system for scrambling/descrambling packets of a stream of content, each of the packets having a must stay clear (MSC) section which is always kept in the clear, the system comprising physical computing machinery including:
  an input handler including:
   a receiving module to receive the stream;
   a characteristic analyzer to analyze the stream in order to determine at least one data independent characteristic of each of the packets; and
  a scrambling/descrambling device operationally associated with the input handler, the scrambling/descrambling device including:
   a receiving module to receive the at least one data independent characteristic for each of the packets from the input handler; and
   an Initial Value module to determine an Initial Value for each of the packets as a function of the at least one data independent characteristic of one of the packets being processed, wherein the scrambling/descrambling device is adapted to at least one of scramble and descramble the packets based on the Initial Value and a Control Word; and an adaptation field manager for introducing entropy into the Initial Value of the packets by performing one of:
artificially creating an adaptation field in at least some of the packets; and
enlarging an existing adaptation field of the at least some packets, such that a length of the adaptation field of the packets is selectable,
wherein the adaptation field forms part of the MSC section, the at least one independent characteristic being at least one of a length of the MSC section and the length of the adaptation field.

11. The system according to claim 10, wherein the Initial Value for each of the packets is also a function of the data content of the MSC section of the one packet being processed.

12. A method for scrambling/descrambling packets of a stream of content, each of the packets having a must stay clear (MSC) section which is always kept in the clear, the method comprising:
receiving the stream with physical computing machinery;
performing, with the physical computing machinery, one of artificially creating an adaptation field in at least some of the packets and enlarging an existing adaptation field of the at least some packets, such that a length of the adaptation field of the packets is selectable, the adaptation field forming part of the MSC section;
analyzing, with the physical computing machinery, the stream in order to determine at least one data independent characteristic of each of the packets, the at least one independent characteristic being at least one of a length of the MSC section and the length of the adaptation field;
determining, with the physical computing machinery, an Initial Value for each of the packets as a function of the at least one data independent characteristic of one of the packets being processed; and
at least one of scrambling and descrambling, with the physical computing machinery, the packets based on the Initial Value and a Control Word.

13. The method according to claim 12, wherein the determining also includes determining the Initial Value for each of the packets as a function of the data content of the MSC section of the one packet being processed.

* * * * *

UNITED STATES PATENT AND TRADEMARK OFFICE
CERTIFICATE OF CORRECTION

PATENT NO. : 7,940,930 B2
APPLICATION NO. : 11/918110
DATED : May 10, 2011
INVENTOR(S) : Shen-Orr et al.

It is certified that error appears in the above-identified patent and that said Letters Patent is hereby corrected as shown below:

delete "(V)" and insert therefor --(IV)-- immediately after the words "Initial Value" in column 12, line 19.

delete "computin" and insert therefor --computing-- in column 13, line 48 (sixth line of claim 5).

Signed and Sealed this
Twenty-eighth Day of June, 2011

David J. Kappos
*Director of the United States Patent and Trademark Office*